United States Patent [19]

Hough et al.

[11] 3,853,941
[45] Dec. 10, 1974

[54] PREPARATION OF ORTHOBORATES OF MONOHYDRIC ALCOHOLS AND PHENOLS

[75] Inventors: William V. Hough, Gibsonia; Clarence R. Guibert, Adams Township, Butler County; Gerald T. Hefferan, Butler, all of Pa.

[73] Assignee: Mine Safety Appliances Company, Pittsburgh, Pa.

[22] Filed: Mar. 1, 1971

[21] Appl. No.: 119,904

[52] U.S. Cl. ............................................. 260/462 R
[51] Int. Cl. .............................................. C07f 5/04
[58] Field of Search ................................ 260/462 R

[56] References Cited
UNITED STATES PATENTS
| | | | |
|---|---|---|---|
| 2,613,219 | 10/1952 | Clark | 260/462 R |
| 2,689,259 | 9/1954 | Schechter | 260/462 R |
| 3,538,168 | 11/1970 | Mitchell | 260/462 R X |

FOREIGN PATENTS OR APPLICATIONS
1,235,610  6/1971  Great Britain ................. 260/462 R

OTHER PUBLICATIONS

Kirk–Othmer, Encyclopedia of Chem. Technology, (1965), Vol. 7, 391–396.
"Molecular Sieves," C. K. Hersch, pp. 78–80, (1961).
"Organoboron Chemistry," H. Steinberg, pp. 47, 48, 103, 104 (1964).

*Primary Examiner*—Leon Zitver
*Assistant Examiner*—D. B. Springer

[57] ABSTRACT

Orthoborates of monohydric alcohols or phenols, $B(OR)_3$, are prepared by reacting a phenol or alcohol, ROH, with boric acid, boric oxide or a trialkoxyboroxine in the presence of molecular sieves, preferably with an inert organic diluent solvent, to form a substantially alcohol-free orthoborate in high yields.

14 Claims, No Drawings

PREPARATION OF ORTHOBORATES OF MONOHYDRIC ALCOHOLS AND PHENOLS

BACKGROUND OF THE INVENTION

Orthoborates of monohydric alcohols and phenols, $B(OR)_3$ where R is an alkyl, aryl or arylalkyl group have been made by the esterification of boric acid, boric oxide or trialkoxyboroxine with an alcohol or phenol. A large number of such esters have been prepared with various substituted aryl or alkyl groups. Under accepted nomenclature the esters are designated as trialkoxyboranes (e.g. trimethoxyborane) or triaryloxyboranes (e.g. triphenoxyborane). Earlier nomenclature or common names are still widely used, especially for those simpler esters that have a long history of wide commercial use; for example, trimethoxyborane may be referred to as trimethylborate or methyl borate.

The esterification reactions are reversible with an equilibrium very unfavorable for the formation of the trialkoxyborane or triaryloxyborane. Accordingly, preparative methods have been directed to shift the equilibrium by using excess alcohol and/or by removal of product water or orthoborates from the reaction mixture. Among the methods reported are those utilizing drying agents such as sulfuric acid, anhydrous copper sulfate or magnesium sulfate, calcium chloride and sulfurated cation exchange resins. These methods generally fail to give a combination of high purity and yield to produce an economical commercial product. Other methods used for preparation of high boiling esters include those in which water is removed from reaction mixtures as an azeotrope with the alcohol or a third component, such as benzene, toluene, carbon tetrachloride or petroleum naptha; such methods are not suitable for the preparation of trimethoxyborane or triethoxyborane as they form low boiling azeotropes with methanol and ethanol respectively. These methods are uneconomical because the azeotropic mixtures of water and alcohol and usually a third component cannot be recycled unless they are chemically separated. Preparation of trimethoxyborane and triethoxyborane have been multi-step processes in which an alcohol-ester azeotrope is prepared and subsequently broken, as, for example, by extraction with mineral oil or other selective solvents or by adsorption of methanol on lithium chloride.

BRIEF DESCRIPTION OF THE INVENTION

In accordance with this invention, orthoborates of monohydric alcohols and phenols are prepared by contacting a boric oxide source material with an alcohol or phenol in the presence of molecular sieves and recovering the orthoborates formed according to the reactions:

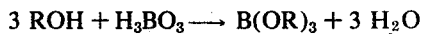

or

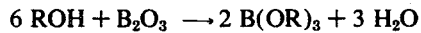

or

where R is an alkyl, aryl or substituted alkyl or aryl group, where the substituted group is not reactive with the orthoborate being synthesized, such as OH groups. When using boroxines, in accordance with equation 3, the R group in the reactant boroxine is the same as the R group in the reactant alcohol or phenol. It is preferred to use molecular sieves which have pores sufficiently small that they will not adsorb the reactant alcohol, in which instance the reactions proceed substantially to completion to the right to form a readily separable liquid phase of the orthoborate and a solid phase of water adsorbed on molecular sieve. It is presently preferred to use an inert solvent to dilute the reaction mixture.

DETAILED DESCRIPTION OF THE INVENTION

This invention is suitable for the production of all orthoborates of a monohydric alcohol or phenol. Such orthoborates have the formula $B(OR)_3$, where R is an alkyl, aryl, aryl substituted alkyl, alkyl substituted aryl, or other substituted alkyl or aryl groups in which the substituted group is not reactive with the orthoborate. Such esters include trialkoxyboranes, e.g. trimethoxyborane, triethoxyborane tri-n-propoxyborane, tri-i-butoxyborane, tri-s-butoxyborane, tri-t-butoxyborane, tri-n-pentoxyborane, tri-i-pentoxyborane, tri-n-hexoxyborane, tri-n-heptoxyborane, tri-n-octoxyborane, tri-n-nonoxyborane, tri-n-decoxyborane, tri-n-decoxyborane, tri-n-octyldecoxyborane; trihaloalkoxyboranes, e.g. tri-2-chloroethoxyborane, tri-1-chloroethoxyborane, tri-2,2-dichloroethoxyborane, tri-3,3,3-trichloroethoxyborane; tri-2,2-bromoethoxyborane, tri-1-fluoroethoxyborane, tri-2,2,2-trifluo-1-chloroethoxyborane; tri-3-chloro-n-propoxyborane; tri-1-chloro-2,2,3,3,3-pentafluoropropoxyborane; cyclic esters, e.g. tricyclohexyloxyborane; and triarybxyboranes, e.g. triphenoxyborane, tri(1-biphenoxy)borane, tritolyloxyborane, tri(p-tert.-butylphenoxy)borane, and tri(ortho-cyclohexylphenoxy)borane.

The orthoborates are prepared by the reaction of boric oxide, boric acid or a boroxine with an alcohol or phenol, ROH, in which R corresponds to that of the orthoborate, $B(OR)_3$ to be prepared. As used herein, boric acid includes metaboric acid, $HBO_2$, and orthoboric acid, $H_3BO_3$, as well as other hydrates of boric oxide with different water content. The boroxines are cyclic compounds of the formula

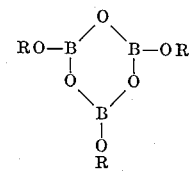

in which R is an alkyl, aryl or substituted alkyl or aryl groups. Boroxines may be prepared from boric acid and primary and secondary alcohols. Lower trialkoxyboroxines, e.g. trimethoxyboroxine, triethoxyboroxine and tripropoxyboroxine, may be prepared by dissolving boric oxide, sometimes with heating, in trialkoxyborane. Other boroxines may be prepared from lower trialkoxyboranes by transesterification reactions.

For the purposes of this invention, the boroxines may be considered as solutions of boric oxide in trialkoxyborane. It is generally preferred to use boric oxide or a boroxine as a boron reactant because they produce less water in the reaction system than do the boric acids.

The reactants are contacted in the liquid phase, either alone or in solution in an inert liquid, with molecular sieves. Molecular sieves are zeolites or similar materials whose atoms are arranged in a crystal lattice in such a way that there are a large number of small cavities interconnected by smaller openings or pores of precisely uniform size. Suitable molecular sieves include the well-known commercially available synthetic metal aluminosilicates, designated as Type A molecular sieves; 4A molecular sieves have a pore diameter of approximately 4A, 5A molecular sieves have a pore diameter of about 5A and 3A molecular sieves have a pore diameter of about 3A. The molecular sieves used in any reaction should preferably have a pore size smaller than the effective diameter of the alcohol or phenol molecule so that the alcohol and phenol is not adsorbed by the molecular sieves: for example, 3A molecular sieves have a pore diameter smaller than the effective molecular diameter of any of the alcohols or phenols and will not adsorb them; 4A molecular sieves will not adsorb alcohols or phenols, except for methanol and ethanol; 5A molecular sieves are suitable for use with all phenols, iso-alcohols and alcohols combining four or more carbon atoms. In the case of preparing trialkoxyboranes from reactions of methanol or ethanol, a satisfactory reaction producing alcohol-trialkoxyborane mixtures is obtained with 4A molecular sieves, even though they do adsorb the alcohol. As exemplified hereinafter where methanol is the alcohol reactant the molecular sieve preferably has a pore diameter of 3A to 4A. It is preferred to use an amount of molecular sieves equal to that which would adsorb an amount of water equal to that produced by the reaction at a water partial pressure of $10^{116}$ $^1$mm.Hg. It will be recognized that larger or smaller amounts of molecular sieves may be used if desired; any amount of molecular sieves will benefit the reaction, but the use of amounts less than preferred generally will not provide over 90 percent yields of the orthoborate; the use of amounts greater than that preferred will generally provide only minor additional benefit in yield.

It is now preferred to dilute the reaction with an inert organic solvent to provide a larger liquid volume that can be better contacted with the molecular sieves, to provide a heat sink for the heat of absorption of water on the molecular sieves and to reduce the amount of orthoborate in the normal liquid holdup on the molecular sieve surfaces (as distinguished from selective adsorption in the crystal cavities). All the orthoborate can be separated from the sieve by conventional washing with the organic solvent or by flushing with an inert gas if the orthoborate is volatile. In those cases where a volatile liquid orthoborate is being prepared, for example trimethoxyborane, the orthoborate itself may be used as diluent solvent and subsequently recovered from the molecular sieves by purging with an inert gas, such as nitrogen. The orthoborates that are prepared by this invention are generally infinitely soluble in aliphatic aromatic solvents; for any particular reaction it is desirable to select a solvent that can be easily separated from the orthoborate as, for example, by distillation or evaporation. For example, xylene is a preferred solvent for use in the preparation of trimethoxyborane as its boiling point is high compared to trimethoxyborane and it does not form an azeotrope with trimethoxyborane. Other examples of suitable inert organic solvents include toluene, mesitylene and benzene. Pentane or benzene are examples of preferred solvents to be used in the preparation of orthoborates having high boiling points, e.g. tricyclohexyloxyborane. It will be recognized that in addition to being chemically inert to the components of the reaction system, the solvents are inert to the molecular sieves, i.e., they are not absorbed in the molecular sieves.

The methods of the invention are especially advantageous for the preparation of trimethoxyborane and triethoxyborane since they can be prepared substantially alcohol free in a single reaction step, thus avoiding the complications of separating the orthoborate from a low boiling azeotrope with alcohol.

The invention is more fully described with reference to the following illustrative examples.

EXAMPLE 1

A solution of 17.71 of trimethoxyboroxine in 30 ml. of m-xylene was mixed with a solution of 21.34 g. of methanol (about 5 percent in excess of stoichiometric) in 30 ml. of m-xylene and with 37.28 g. of 3A molecular sieves. The mixture was mildly agitated with a wrist-action shaker for 3 hours at room temperature. The reaction liquid was decanted and the molecular sieve was mixed with 90 ml. of m-xylene that was then decanted and combined with the previously decanted reaction liquid. The recovered liquid contained an 87.5 percent yield of trimethoxyborane with about 1–3 percent methanol impurity. The trimethoxyborane was readily separated and recovered by distillation from the high boiling xylene solvent.

EXAMPLE 2

The molecular sieve from the previous example was regenerated for reuse by heating in vacuum at 160°–180°. This molecular sieve was mixed with a solution of 15.257 g. of trimethoxyboroxine in 30 ml. of m-xylene and 20.71 g. of methanol in 30 ml. of m-xylene, agitated for 18 hours, decanted and washed with 120 ml. of m-xylene as in example 1. The yield of trimethoxyborane was 92.5 percent with about 1–3 percent methanol impurity.

EXAMPLE 3

Example 2 is repeated except that 12.16 g. of trimethoxyboroxine and 14.42 g. of methanol is used, providing a higher proportion of molecular sieve of about 3 parts by weight for each part of trimethoxyboroxine, and the reaction time was 2 hours. A 99.5 percent of trimethoxyborane of over 99 percent purity was obtained.

EXAMPLE 4

Example 3 was repeated except that 12.00 g. of trimethoxyboroxine and 13.66 g. of methanol (stoichiometric) were reacted for 3¼ hours. The yield of trimethoxyborane was 97.3 percent with methanol impurity of less than 1 percent.

EXAMPLE 5

The reaction and regeneration steps as in the previous examples were repeated 16 times using a 2¼ to 3 hour room temperature reaction, between about 2 and 3 parts by weight molecular sieves per part of trimethoxyboroxine, from 10 to 60 ml. of m-xylene diluent, from 70–120 ml. of xylene wash, and various grades of xylene, including 95+ percent m-xylene, c.p. m-xylene and p-xylene and 99 percent and 99+ percent commercial p-xylene. The yield of trimethoxyborane ranged between 83 and 99.7 percent. The methanol impurity being in the range of 1–3 percent, or less.

In the preparation of trimethoxyborane from trimethoxyboroxine and methanol in the presence of 3A molecular sieves, it is preferred to use a slight excess of methanol, suitably 5 to 10 percent in excess of stoichiometric, and about 3 parts by weight of molecular sieves for each part by weight of trimethoxyboroxine. Recovery of the product is facilitated if the reaction mixture is diluted with at least about 3 ml. of inert solvent for each gram of trimethoxyborane, and preferably about 4 ml.

EXAMPLE 6

12.475 g. of trimethoxyboroxine in 30 ml. of trimethoxyborane was added to 15.00 g. of methanol in 30 ml. of trimethoxyborane. The mixture was added to 41.56 of 3A molecular sieves and mildly agitated for 1.5 hours. A total of 84.4 ml. of trimethoxyborane was recovered, 73 ml. by decantation and 11.4 by vacuum evaporation from the molecular sieves at room temperature. This was a 98.8 percent recovery of trimethoxyborane based on the amount theoretically produced by the reaction plus that used as a reaction diluent.

EXAMPLE 7

5.014 g. of $B_2O_3$ was dissolved at room temperature in 14.119 g. of methanol and 30 ml. of trimethoxyborane. The solution was added to 41.49 g. of 3A molecular sieves and allowed to stand at ambient temperature for 19 hours. A 95 percent yield of trimethoxyborane, with about 1 percent methanol impurity, was recovered by decantation and vacuum evaporation as in the previous example.

EXAMPLE 8

When 2.23 g. of trimethoxyboroxine was added to 2.33 grams of methanol over 3.95 g. of 4A molecular sieve, slight heat was evolved and a clear colorless solution resulted. The methanol content of the solution after 2 hours had decreased to about 30 percent and no further change occurred over 17 additional hours. The resultant trimethoxyborane-methanol solution contained about 30 percent methanol, very near the composition of the trimethoxyborane-methanol azeotrope.

The 4A molecular sieves will adsorb methanol as well as water and any methanol adsorbed will not be available for reaction to form trimethoxyborane. A satisfactory reaction to provide a product of trimethoxyborane-methanol is obtained if an excess of methanol is used to account for that adsorbed by the molecular sieves, about 18 g. of methanol per 100 g. of molecular sieves.

EXAMPLE 9

17.58 g. of trimethoxyboroxine, 27.17 g. of methanol and 60 ml. of xylene was mixed together with 33.68 g. of 4A molecular sieves for about 4 hours at room temperature. The resultant liquid product was decanted, the molecular sieves were washed with 120 ml. of m-xylene, and the wash liquid was decanted and combined with the previous decant. The product recovered in xylene was 93.5 percent yield of a trimethoxyborane containing about 18 percent methanol. This product was added to 49 g. of 4A molecular sieve and allowed to stand at room temperature for about 5 hours, by which time substantially all the methanol was removed leaving a liquid phase of methyl borate solution in xylene. The liquid was separated from the molecular sieve and substantially pure trimethoxyborane was distilled from the xylene solution. The methanol absorbed by the molecular sieve is recovered and the molecular sieve regenerated by conventional means, such as by heating.

When using 4A molecular sieves in the reaction of trimethoxyboroxine with methanol it is preferred to use about 1.9 g. of molecular sieves and about 1.54 g. of methanol for each g. of trimethoxyboroxine to obtain optimum yields. The reaction proceeds readily in an inert organic solvent, e.g. m-xylene, to give a product in the solvent containing methanol (about 18 percent), but less methanol than the trimethoxyborane-methanol azeotrope (26 percent by weight).

The separation of methanol from mixtures with trimethoxyborane by treatment with 4A molecular sieves is useful in conjunction with prior methods of making such mixtures. The methanol is removed by being absorbed on the molecular sieves, which can be regenerated by conventional methods for reuse.

EXAMPLE 10

110.5 meg. of boron as trimethoxyboroxine was added to 203.5 millimols of methanol in 228 millimols of trimethoxyborane over 13.5 g. of 4A molecular sieve. The mixture was refluxed under a nitrogen atmosphere for several hours, cooled to room temperature and filtered. The filtrate contained 290 meg. of the 338 meg. of boron charged and 62 meg. of hydroxyl; this amounted to recovery of the trimethoxyborane charged plus about a 70 percent yield of trimethoxyborane azeotrope composition produced by the reaction.

EXAMPLE 11

100 mmol of $B_2O_3$ and 760 mmol of methanol were charged to 36 g. of 4A molecular sieves and 30 ml. of m-xylene. The reaction mixture was agitated slightly from time to time by shaking the flask by hand over a period of 2 to 3 hours and the mixture was allowed to stand overnight. Subsequently, the liquor was filtered off the molecular sieves using a sintered glass frit and the filtrate was vacuum condensed to remove volatile trimethoxyborane. The distillate was methyl borate and methanol in m-xylene, with a methanol content 7.6 meg/ml; boron as methyl borate was 167 meg. total, a yield of 83.4 percent. The non-volatile boric acid left behind contained 1.8 meg. of boron or 0.9 percent of the charge. The 15 percent boron unaccounted for remained on the molecular sieves since no attempt was made to wash the sieves with xylene or methanol.

EXAMPLE 12

3.53 g. of boric oxide and 18.14 g. of n-propanol were added to 18.75 g. of 3A molecular sieves and the mixture was agitated overnight, a sample of the liquid subjected to infrared analysis was mostly tri-n-propoxyborane. Some n-propanol and a small amount of insoluable boric oxide were left unreacted.

EXAMPLE 13

Benzene was used as a solvent for the preparation of tri-n-propoxyborane by adding 6.94 g. of boric oxide to a reaction mixture of 36.11 g. of n-propanol and 60 ml. of benzene over 37.27 g. of 3A molecular sieves. The reaction mixture was shaken by hand for 10 minutes and agitated in a wrist action shaker for two hours. The reaction mixture was then filtered to remove product and benzene from the molecular sieves. The benzene was then distilled from the product. A total of 34.3 g. of product was recovered, identified by infrared as high purity tri-n-propoxyborane: $\eta^{22°} = 1.3967$, boron 5.21 meg/g compared to 5.30 theory. The recovered yield was 92.2 percent theory based on $B_2O_3$ charged.

EXAMPLE 14

6.95 g. of boric oxide was added to 60.18 g. of cyclohexanol in 60 ml. of benzene over 37.34 g. of 4A molecular sieve. During the boric oxide addition the reaction flask was agitated by hand and heat evolution was evident. The reaction mixture was agitated in a wrist action shaker overnight. The mixture was then filtered, the molecular sieves were twice washed with 20 ml. of benzene and the wash liquor combined with the filtrate. The benzene was then distilled off of the product. The product yield was 60.2 g. 98 percent of theory based on boric oxide charged. The product was identified as high-purity tri-cyclohexylborate by infrared analysis, boron analysis of 3.10 meg/g (3.15 theory), and its m.p. of 50°–55° as recorded in the literature. After vacuum pumping the product, the boron content was 3.15 meg/g.

EXAMPLE 15

The foregoing examples have been directed primarily to reactions using boric oxide or trialkoxyboroxine, which reactions produce less water than those with boric acid. Boric acids may be used in the same manner as boric oxide or trialkoxyboroxines except that a higher proportion of molecular sieves is required to absorb the additional water in the boric acid. To illustrate, 100 mmol. of boric acid and 540 mmol. of methanol were charged to 17.4 g. of 4A molecular sieves and 30 ml. of m-xylene. The flask was agitated by hand from time to time over a period of 3 to 4 hours. The reaction mixture was filtered through a sintered glass frit and the molecular sieves on the filter were washed with xylene. The volatile trimethoxyborane, methanol, and xylene were vacuum condensed from the filtrate. Trimethoxyborane recovered in the xylene-methanol solution was 90.3 mmol., 90.3 percent yield. Boric acid left behind was 3.1 percent. Methanol wash of the molecular sieves gave an additional 3.4 meg of boron for a total boron recovery of 96.8 percent.

It will be recognized that the molecular sieves separated from the above reaction, containing absorbed water, can be regenerated for reuse by removing the water by any conventional means in addition to the vacuum treatment used in foregoing examples.

We claim:

1. A method of preparing a trimethoxyborane comprising the step of reacting in the liquid phase a boron-containing reactant selected from the group consisting of boric oxide, boric acid and trimethoxyboroxine with methanol in the presence of a water absorbing molecular sieve having a pore diameter of about 3A to about 4A, the molecular sieve being present in an amount sufficient to absorb substantially all of the water produced by the reaction, and separating the resultant liquid phase containing the trimethoxyborane from the molecular sieve.

2. A method, as in claim 1, wherein the reactants are present in the liquid phase in about stoichiometric proportions.

3. A method, as in claim 2, wherein the reaction is carried out in the presence of an inert solvent.

4. A method, as in claim 3, wherein the solvent is trimethoxyborane.

5. A method, as in claim 3, wherein the boron reactant is trimethoxyboroxine.

6. A method, as in claim 3, wherein the amount of the molecular sieve is about equal to that amount that will absorb substantially all of the water produced by the reaction at a partial pressure of $10^{-1}$ mm. Hg.

7. A method, as in claim 5, wherein about three parts by weight of molecular sieve are used for each part of trimethoxyboroxine.

8. A method, as in claim 7, wherein between about 5 and 10 percent stoichiometric excess of methanol is employed.

9. A method of preparing trimethoxyborane which comprises the steps of contacting and reacting in the liquid phase trimethoxyboroxine and methanol in about stoichiometric proportions in the presence of an inert liquid diluent having a boiling point higher than trimethoxyborane and a water absorbing 3A molecular sieve in an amount sufficient to absorb substantially all of the water produced by the reaction, separating the resultant liquid phase containing trimethoxyborane and diluent from the molecular sieve, and separating the trimethoxyborane from said resultant liquid phase by distillation.

10. A method, as in claim 9, wherein the inert diluent is xylene.

11. A method, as in claim 10, wherein 5 to 10 percent stoichiometric excess of methanol is employed.

12. A method of preparing trimethoxyborane comprising the steps of contacting and reacting boric oxide with about six moles of methanol for each mole of boric oxide in the presence of trimethoxyborane diluent and sufficient water absorbing 3A molecular sieve to absorb substantially all of the water produced by said reaction and separating the resultant liquid phase from the molecular sieve.

13. A method of preparing a trimethoxyborane comprising the step of reacting in the liquid phase a boron-containing reactant selected from the group of boric oxide, boric acid and trimethoxyboroxine with methanol in the presence of a water absorbing 4A molecular sieve, the molecular sieve being present in an amount sufficient to absorb substantially all of the water produced by the reaction, and separating the resultant liquid phase containing the trimethoxyborane from the molecular sieve.

14. A method of preparing a trimethoxyborane comprising the step of reacting in the liquid phase a boron-containing reactant selected from the group of boric oxide, boric acid and trimethoxyboroxine with methanol in the presence of a water absorbing 3A molecular sieve, the molecular sieve being present in an amount sufficient to absorb substantially all of the water produced by the reaction, and separating the resultant liquid phase containing the trimethoxyborane from the molecular sieve.

* * * * *